(12) United States Patent
Wheeler et al.

(10) Patent No.: US 11,661,919 B2
(45) Date of Patent: May 30, 2023

(54) ODOMETER-BASED CONTROL OF A WIND TURBINE POWER SYSTEM

(71) Applicant: General Electric Company, Schenectady, NY (US)

(72) Inventors: Frederick Wilson Wheeler, Niskayuna, NY (US); Dayu Huang, Rexford, NY (US); George Theodore Dalakos, Niskayuna, NY (US); Ameet Shridhar Deshpande, Schenectady, NY (US); Su Liu, Niskayuna, NY (US); Dhiraj Arora, Rexford, NY (US); Siyun Wang, Shanghai (CN)

(73) Assignee: General Electric Company, Schenectady, NY (US)

( * ) Notice: Subject to any disclaimer, the term of this patent is extended or adjusted under 35 U.S.C. 154(b) by 116 days.

(21) Appl. No.: 17/152,850

(22) Filed: Jan. 20, 2021

(65) Prior Publication Data

US 2022/0228559 A1    Jul. 21, 2022

(51) Int. Cl.
*F03D 7/04* (2006.01)
*F03D 9/25* (2016.01)
(Continued)

(52) U.S. Cl.
CPC .......... *F03D 7/045* (2013.01); *F03D 7/0284* (2013.01); *F03D 7/046* (2013.01); *F03D 9/255* (2017.02);
(Continued)

(58) Field of Classification Search
CPC ........ F03D 7/045; F03D 7/0284; F03D 7/046; F03D 9/255; F03D 17/00; F05B 2260/84;
(Continued)

(56) References Cited

U.S. PATENT DOCUMENTS

| | | |
|---|---|---|
| 2,837,984 A | 6/1958 | Klotz |
| 6,922,640 B2 | 7/2005 | Vezzu et al. |

(Continued)

FOREIGN PATENT DOCUMENTS

| | | |
|---|---|---|
| CN | 101218401 A | 7/2008 |
| CN | 106097146 A | 11/2016 |

(Continued)

OTHER PUBLICATIONS

Barradas Berglind, Fatigue-Damage Estimation and Control for Wind Turbines, Department of Electronic Systems, Automation & Control, Ph.D. Thesis Aalborg University, 2015, 70 Pages. https://doi.org/10.5278/vbn.phd.engsci.00040.

(Continued)

*Primary Examiner* — Joseph Ortega
(74) *Attorney, Agent, or Firm* — Dority & Manning, P.A.

(57) ABSTRACT

A method for controlling a wind turbine connected to an electrical grid includes receiving, via a controller, a state estimate of the wind turbine. The method also includes determining, via the controller, a current condition of the wind turbine using, at least, the state estimate, the current condition defining a set of condition parameters of the wind turbine. Further, the method includes receiving, via the controller, a control function from a supervisory controller, the control function defining a relationship of the set of condition parameters with at least one operational parameter of the wind turbine. Moreover, the method includes dynamically controlling, via the controller, the wind turbine based on the current condition and the control function for multiple dynamic control intervals.

20 Claims, 12 Drawing Sheets

(51) Int. Cl.
*F03D 17/00* (2016.01)
*F03D 7/02* (2006.01)

(52) U.S. Cl.
CPC .......... *F03D 17/00* (2016.05); *F05B 2260/84* (2013.01); *F05B 2270/1033* (2013.01); *F05B 2270/32* (2013.01); *F05B 2270/321* (2013.01); *F05B 2270/323* (2013.01); *F05B 2270/325* (2013.01); *F05B 2270/331* (2013.01); *F05B 2270/337* (2013.01); *F05B 2270/404* (2013.01)

(58) Field of Classification Search
CPC .......... F05B 2270/1033; F05B 2270/32; F05B 2270/321; F05B 2270/323; F05B 2270/325; F05B 2270/331; F05B 2270/337; F05B 2270/404
See application file for complete search history.

(56) References Cited

U.S. PATENT DOCUMENTS

| | | |
|---|---|---|
| 6,975,925 B1 | 12/2005 | Barnes et al. |
| 7,149,657 B2 | 12/2006 | Goebel et al. |
| 7,256,508 B2 | 8/2007 | Altemark et al. |
| 7,395,188 B1 | 7/2008 | Goebel et al. |
| 7,548,830 B2 | 6/2009 | Goebel et al. |
| 7,725,293 B2 | 5/2010 | Bonissone et al. |
| 7,889,840 B2 | 2/2011 | Vasudevan et al. |
| 7,895,016 B2 | 2/2011 | Vittal et al. |
| 8,108,080 B2 | 1/2012 | Wakata et al. |
| 8,249,852 B2 | 8/2012 | Thulke |
| 8,451,134 B2 | 5/2013 | Bharadwaj et al. |
| 8,554,386 B2 | 10/2013 | Rutman |
| 8,649,911 B2 | 2/2014 | Avagliano et al. |
| 8,694,268 B2 | 4/2014 | Karikomi et al. |
| 8,928,164 B2 | 1/2015 | Bowyer et al. |
| 8,930,299 B2 | 1/2015 | Pyle et al. |
| 9,018,782 B2 | 4/2015 | Couchman et al. |
| 9,035,479 B1 | 5/2015 | Gates |
| 9,074,468 B1 | 7/2015 | Selman et al. |
| 9,097,236 B2 | 8/2015 | Zhou et al. |
| 9,194,376 B2 | 11/2015 | Ritter et al. |
| 9,395,270 B2 | 7/2016 | Czemiak et al. |
| 9,599,096 B2 | 3/2017 | Spruce et al. |
| 9,644,609 B2 | 5/2017 | Turner et al. |
| 9,797,328 B2 | 10/2017 | Martinez et al. |
| 9,816,483 B2 | 11/2017 | Nakamura et al. |
| 9,859,787 B2 | 1/2018 | Wagoner et al. |
| 9,874,107 B2 | 1/2018 | Falb et al. |
| 9,897,516 B2 | 2/2018 | Bechhoefer et al. |
| 10,181,101 B2 | 1/2019 | Zhang et al. |
| 10,288,038 B2 | 5/2019 | Badrinath Krishna et al. |
| 10,288,043 B2 | 5/2019 | Yu et al. |
| 10,436,178 B2 | 10/2019 | Hales et al. |
| 2004/0260512 A1 | 12/2004 | Olsson |
| 2005/0005186 A1 | 1/2005 | Goebel et al. |
| 2006/0228214 A1 | 10/2006 | Mabe et al. |
| 2008/0140361 A1 | 6/2008 | Bonissone et al. |
| 2011/0020122 A1 | 1/2011 | Parthasarathy et al. |
| 2012/0029892 A1* | 2/2012 | Thulke .................. F03D 7/045 703/7 |
| 2012/0049516 A1* | 3/2012 | Viassolo .................. F03D 9/10 290/44 |
| 2012/0065901 A1 | 3/2012 | Bechhoefer et al. |
| 2012/0286509 A1 | 11/2012 | Rafoth |
| 2013/0035798 A1 | 2/2013 | Zhou et al. |
| 2013/0073223 A1 | 3/2013 | Lapira et al. |
| 2013/0257051 A1 | 10/2013 | Spruce et al. |
| 2013/0270827 A1 | 10/2013 | Couchman et al. |
| 2013/0320674 A1 | 12/2013 | Ingram |
| 2014/0248123 A1 | 9/2014 | Turner et al. |
| 2014/0288855 A1 | 9/2014 | Deshpande |
| 2014/0324495 A1 | 10/2014 | Zhou et al. |
| 2015/0003983 A1 | 1/2015 | Coultate |
| 2015/0176569 A1 | 6/2015 | Karikomi et al. |
| 2015/0381443 A1 | 12/2015 | Du Plessis |
| 2016/0010628 A1* | 1/2016 | Dhar ...................... F03D 17/00 702/34 |
| 2017/0096983 A1 | 4/2017 | Hales et al. |
| 2017/0241405 A1 | 8/2017 | Kruger et al. |
| 2018/0142674 A1 | 5/2018 | Hammerum et al. |
| 2018/0156197 A1 | 6/2018 | Spruce |
| 2018/0171979 A1 | 6/2018 | Spruce |
| 2018/0173214 A1 | 6/2018 | Higgins et al. |
| 2018/0173215 A1 | 6/2018 | Spruce et al. |
| 2018/0180024 A1 | 6/2018 | Spruce |
| 2018/0180025 A1 | 6/2018 | Spruce et al. |
| 2018/0180026 A1 | 6/2018 | Spruce et al. |
| 2018/0187648 A1 | 7/2018 | Spruce et al. |
| 2018/0187649 A1 | 7/2018 | Spruce et al. |
| 2018/0187650 A1 | 7/2018 | Byreddy et al. |
| 2018/0223808 A1 | 8/2018 | Spruce |
| 2019/0203696 A1 | 7/2019 | Kaucic et al. |
| 2020/0347824 A1 | 11/2020 | Yu et al. |

FOREIGN PATENT DOCUMENTS

| | | |
|---|---|---|
| CN | 110059872 A | 7/2019 |
| EP | 2053241 A1 | 4/2009 |
| EP | 2578874 A1 | 4/2013 |
| EP | 2457320 B1 | 4/2014 |
| EP | 2837984 B1 | 5/2019 |
| EP | 2956831 B1 | 8/2019 |
| WO | WO2017000955 A1 | 1/2017 |
| WO | WO2017000958 A1 | 1/2017 |
| WO | WO2017000959 A1 | 1/2017 |
| WO | WO2017000963 A1 | 1/2017 |
| WO | WO2017000964 A1 | 1/2017 |
| WO | WO2017205221 A1 | 11/2017 |
| WO | WO2019/148775 A1 | 8/2019 |
| WO | WO 2019/214785 A1 | 11/2019 |
| WO | WO2020/200421 A1 | 10/2020 |
| WO | WO 2020/212119 A1 | 10/2020 |

OTHER PUBLICATIONS

Spruce, Simulation and Control of Windfarms, University of Oxford, Department of Engineering Science, Ph.D. Thesis, 1993, 241 Pages. https://ora.ox.ac.uk/objects/uuid:24f51a31-e2f9-422f-9837-3c28cfe12ccc.

European Search Report for EP application No. 22151014.2, dated Jun. 23, 2022.

* cited by examiner

ODOMETER-BASED CONTROL OF A WIND TURBINE POWER SYSTEM

FIELD

The present disclosure relates generally to wind turbines and, more particularly, to odometer-based control of wind turbine power systems.

BACKGROUND

Wind power is considered one of the cleanest, most environmentally friendly energy sources presently available and wind turbines have gained increased attention in this regard. A modern wind turbine typically includes a tower, a generator, a gearbox, a nacelle, and one or more rotor blades. The rotor blades are the primary elements for converting wind energy into electrical energy. The blades typically have the cross-sectional profile of an airfoil such that, during operation, air flows over the blade producing a pressure difference between its sides. Consequently, a lift force, which is directed from the pressure side towards the suction side, acts on the blade. The lift force generates torque on the main rotor shaft, which is connected to a generator for producing electricity.

Typically, wind turbines are designed to operate at a nominal power output over a predetermined or anticipated operating life. For instance, a typical wind turbine is designed for a 20-year life. However, in many instances, this anticipated overall operating life is limited or based on the anticipated fatigue life of one or more of the wind turbine components. The life consumption or operational usage of the wind turbine (which can include fatigue or extreme loads, wear, and/or other life parameters) as used herein generally refers to the life of the wind turbine or its components that has been consumed or exhausted by previous operation. Thus, for conventional wind turbines, various preventative maintenance actions are generally scheduled at predetermined time intervals over the life of the wind turbine to prevent accelerated life consumption that may occur if such maintenance actions were not performed.

However, the cost and associated downtime of such maintenance actions are significant drivers for the overall lifecycle cost of the wind turbine and should therefore be optimized. In addition, wind turbines with higher operational usage may be under-maintained and more at risk for unplanned poor-quality events. Similarly, wind turbines with lower operational usage may over-maintained.

Thus, an improved system and method for controlling wind turbines, e.g., using odometer-based control, would be welcomed in the art to address the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method for controlling a wind turbine connected to an electrical grid. The method includes receiving, via a controller, a state estimate of the wind turbine. The method also includes determining, via the controller, a current condition of the wind turbine using, at least, the state estimate, the current condition defining a set of condition parameters of the wind turbine. Further, the method includes receiving, via the controller, a control function from a supervisory controller, the control function defining a relationship of the set of condition parameters with at least one operational parameter of the wind turbine. Moreover, the method includes dynamically controlling, via the controller, the wind turbine based on the current condition and the control function for multiple dynamic control intervals.

In an embodiment, the set of condition parameters may include characteristics of the electrical grid, wind, or an environment of the wind turbine. Thus, for example, the set of condition parameters may include wind speed, wind direction, wind shear, wind veer, turbulence, ambient temperature, humidity, an operating state of the wind turbine, one or more grid conditions, or similar as well as combinations thereof. In such embodiments, the grid condition(s) may include, for example, grid power factor, grid voltage, or grid current.

In another embodiment, the set of condition parameters of the wind turbine may be estimated, measured, predicted, or combinations thereof.

In further embodiments, the method may include determining the state estimate by computer modeling a state of the wind turbine as a high-dimensional vector, wherein the state estimate defines at least one of dynamic motion, elastic deformation, and mechanical stress of the wind turbine.

In additional embodiments, determining the current condition of the wind turbine using, at least, the state estimate may include receiving, via a condition estimator module, the state estimate of the wind turbine and one or more external measurements and determining, via the condition estimator module, the current condition of the wind turbine using the state estimate of the wind turbine and the one or more external measurements.

In an embodiment, the control function may include a look-up table, a mathematical function, or similar.

In yet another embodiment, the method may include determining one or more damage levels of one or more components of the wind turbine using one or more damage odometers as a function of the state estimate of the wind turbine. In such embodiments, the method may include determining, via a function design module of the supervisory controller, the control function based on at least one of a condition distribution, a model of operational behavior of the wind turbine, a design lifetime of the wind turbine, an elapsed lifetime of the wind turbine, one or more damage limits, the one or more damage levels, or a future value discount.

Moreover, in an embodiment, the model of operational behavior of the wind turbine defines a mapping from the set of condition parameters of the wind turbine and the at least one operational parameter of the wind turbine to expected power statistics of the wind turbine and an expected increment to the one or more damage levels for each of the multiple dynamic control intervals. In such embodiments, the expected power statistics of the wind turbine may include power production, power factor, power stability of the wind turbine, or similar.

In further embodiments, the model of operational behavior of the wind turbine may define an uncertainty level for outputs of the model.

In several embodiments, the method may include determining the model of operational behavior of the wind turbine using at least one of simulation, machine learning, design of experiments, or combinations thereof.

In particular embodiments, dynamically controlling the wind turbine based on the current condition and the control function for each of the multiple dynamic control intervals may include dynamically changing, via a dynamic function module of the controller, the operational parameter(s) of the wind turbine based on the current condition and the control function for each of the multiple dynamic control intervals.

In yet another aspect, the present disclosure is directed to a system for controlling a wind turbine connected to an electrical grid. The system includes a turbine controller for generating a state estimate of the wind turbine and a supervisory controller communicatively coupled to the turbine controller. The supervisory controller includes a dynamic function module, a condition estimator module, and a function design module. Accordingly, the condition estimator module determines a current condition of the wind turbine using, at least, the state estimate, the current condition defining a set of condition parameters of the wind turbine. Further, the dynamic function module receives a control function from the function design module, the control function defining a relationship of the set of condition parameters with at least one operational parameter of the wind turbine. Moreover, the dynamic function module determines and sends the operational parameter(s) to the turbine controller to dynamically control the wind turbine based on the current condition and the control function for multiple dynamic control intervals. It should be understood that the system may further be configured to with any of the features described herein.

These and other features, aspects and advantages of the present invention will become better understood with reference to the following description and appended claims. The accompanying drawings, which are incorporated in and constitute a part of this specification, illustrate embodiments of the invention and, together with the description, explain the principles of the invention.

BRIEF DESCRIPTION OF THE DRAWINGS

A full and enabling disclosure of the present invention, including the best mode thereof, directed to one of ordinary skill in the art, is set forth in the specification, which refers to the appended figures, in which.

DETAILED DESCRIPTION

Figure 1:
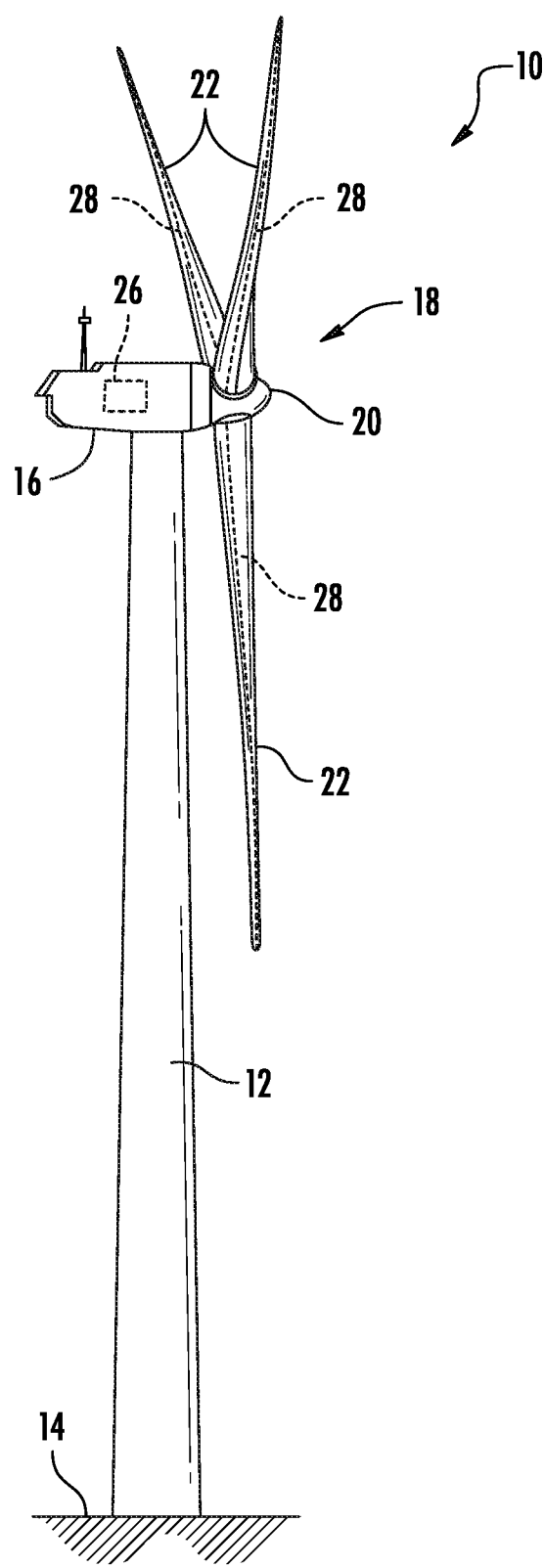
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed odometer-based supervisory control of a wind turbine. For example, in an embodiment, as the wind turbine operates, cumulative damage done to turbine components with respect to their failure modes can be estimated and tracked. Supervisory control adjusts the operation of the wind turbine to achieve a long-term operational goal. The operational goal may be to maximize energy or revenue production while keeping extreme loads and cumulative damage metrics within limits. Alternatively, the operational goal may be to minimize one or more cumulative damage metrics while keeping extreme loads and other cumulative damage metrics within limits. The supervisory control policy or function can also be updated as damage accumulates, and as estimates of turbine operational performance and long-term wind conditions change.

The present disclosure provides many advantages not present in the prior art. For example, the present disclosure may be implemented within the turbine controller hardware, on a different computer within or at the wind turbine site, or on a network-connected computer elsewhere at the wind farm or other nearby or remote location. Furthermore, the present disclosure can utilize readily-available/already-existing operational data and is not necessarily required to collect new or additional data (although new or additional sensors may be utilized if desired). Further, the present disclosure can be applied to any wind turbine, regardless of model, design, size, or manufacturer. Moreover, the system and method of the present disclosure is based upon direct continuous optimization of the highest-level goals and constraints for wind turbines, which maximizes energy production while constraining fatigue damage for each turbine independently. Furthermore, the system and method of the present disclosure enables mechanical design and load margins to be fully utilized for each wind turbine, based upon how each turbine is actually operated and the conditions a particular turbine actually experiences.

Referring now to the drawings, FIG. 1 illustrates a perspective view of one embodiment of a wind turbine 10 configured to implement the control technology according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a corrective action. As such, the controller 26 may include a computer or other suitable processing unit. Thus, in several embodiments, the controller 26 may include suitable computer-readable instructions that, when implemented, configure the controller 26 to perform various functions, such as receiving, transmitting and/or executing wind turbine control signals.

Accordingly, the controller 26 may generally be configured to control the various operating modes of the wind turbine 10 (e.g., start-up or shut-down sequences), de-rate the wind turbine 10, and/or control various components of the wind turbine 10. For example, the controller 26 may be configured to control the blade pitch or pitch angle of each of the rotor blades 22 (i.e., an angle that determines a perspective of the rotor blades 22 with respect to the direction of the wind) to control the power output generated by the wind turbine 10 by adjusting an angular position of at least one rotor blade 22 relative to the wind. For instance, the controller 26 may control the pitch angle of the rotor blades 22 by rotating the rotor blades 22 about a pitch axis 28, either individually or simultaneously, by transmitting suitable control signals to a pitch drive or pitch adjustment mechanism (not shown) of the wind turbine 10.

Figure 2:
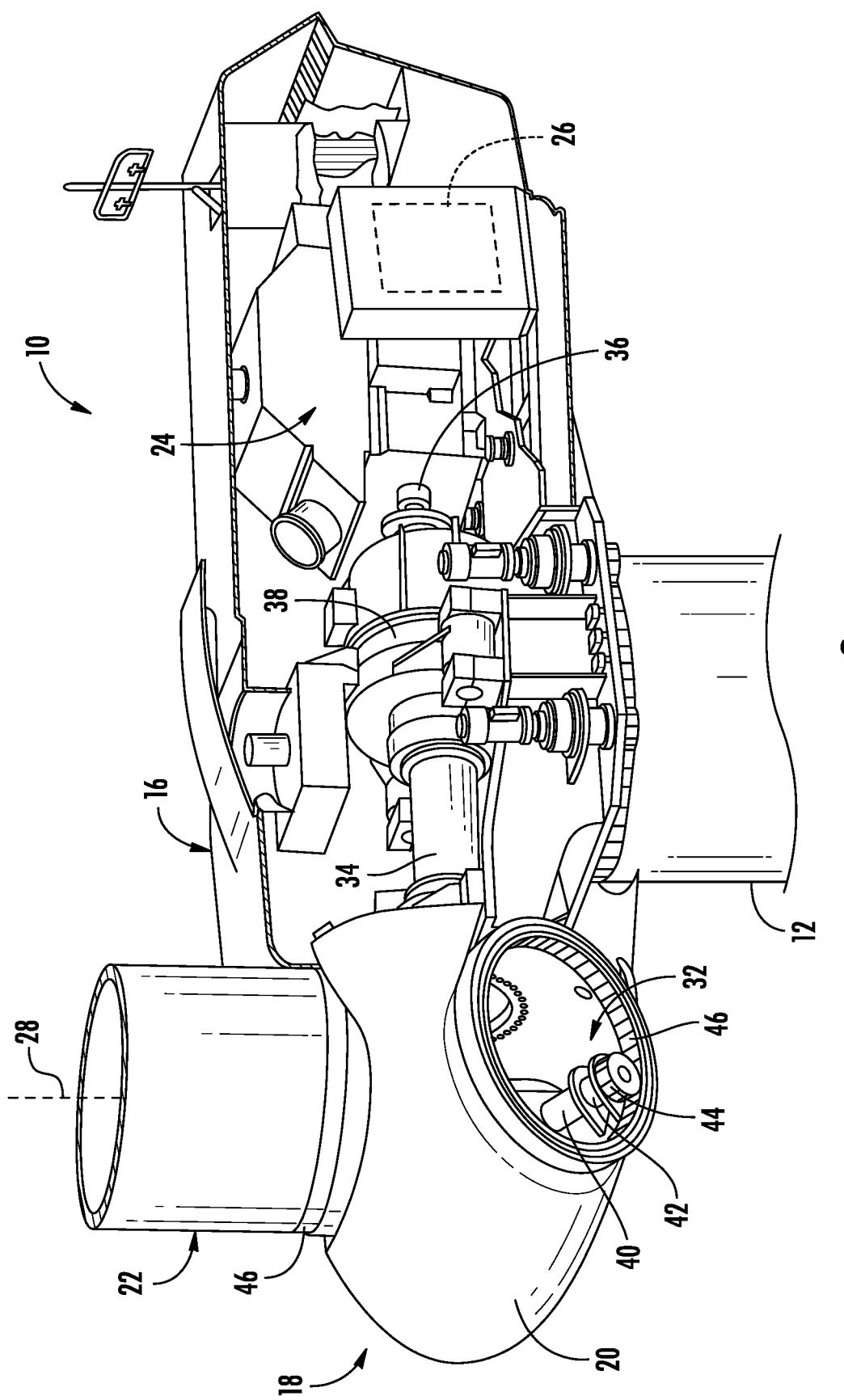
FIG. 2 illustrates a simplified, internal view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 66 communicatively coupled to the controller 26, with each yaw drive mechanism(s) 66 being configured to change the angle of the nacelle 16 relative to the wind (e.g., by engaging a yaw bearing 68 of the wind turbine 10).

Figure 3:
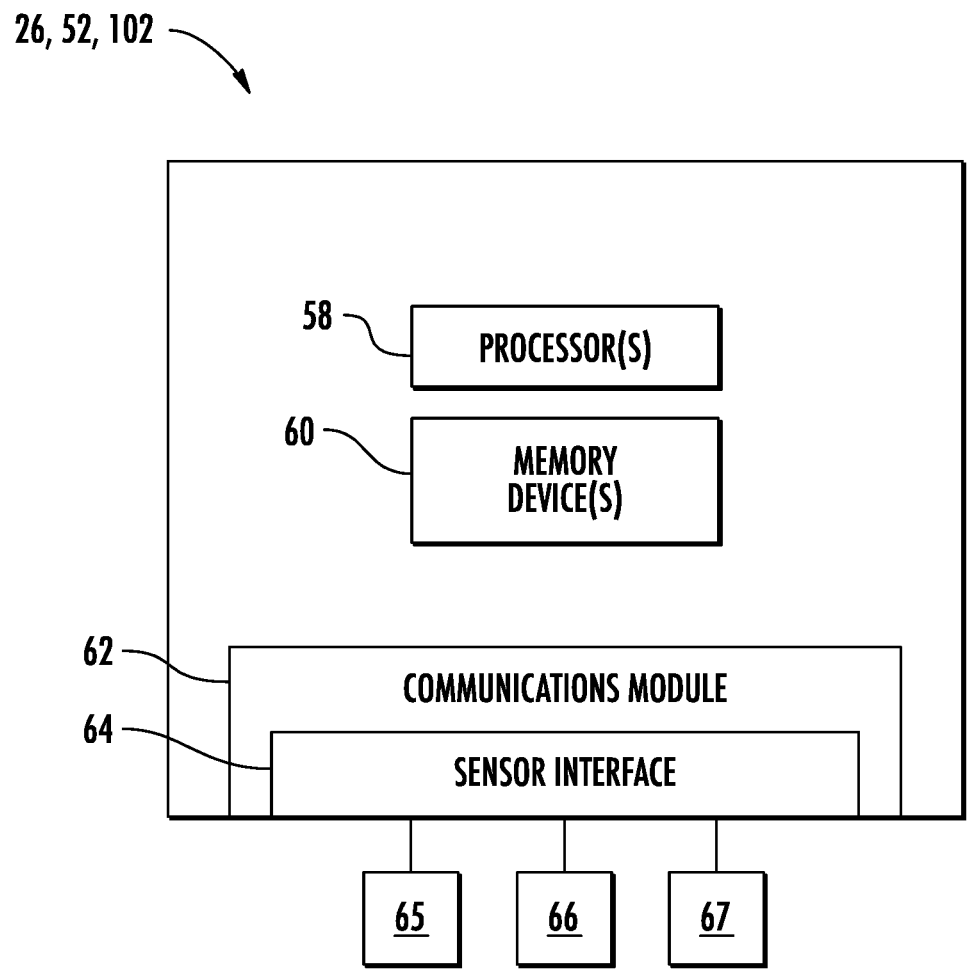
FIG. 3 illustrates a schematic view of one embodiment of suitable components that may be included within a turbine controller of the wind turbine shown in FIG. 1.

Referring now to FIG. 3, a block diagram of one embodiment of suitable components that may be included within a controller in accordance with aspects of the present disclosure is illustrated. It should be understood that the various components of the controller of FIG. 3 may be applicable to any suitable controller, including for example, the turbine controller 26, the farm-level controller 56, and/or supervisory controller 102 described herein.

As shown, the controller may include one or more processor(s) 58 and associated memory device(s) 60 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Additionally, the controller may also include a communications module 62 to facilitate communications between the controller and the various components of the wind turbine 10. For instance, the communications module 62 may include a sensor interface 64 (e.g., one or more analog-to-digital converters) to permit the signals transmitted by one or more sensors 65, 66, 67 to be converted into signals that can be understood and processed by the controller. It should be appreciated that the sensors 65, 66, 67 may be communicatively coupled to the communications module 62 using any suitable means. For example, as shown in FIG. 3, the sensors 65, 66, 67 are coupled to the sensor interface 64 via a wired connection. However, in other embodiments, the sensors 65, 66, 67 may be coupled to the sensor interface 64 via a wireless connection, such as by using any suitable wireless communications protocol known in the art. As such, the processor 58 may be configured to receive one or more signals from the sensors 65, 66, 67.

The sensors 65, 66, 67 of the wind turbine 10 may be any suitable sensors configured to measure any operational condition and/or wind parameter at or near the wind turbine. For example, the sensors 65, 66, 67 may include blade sensors for measuring a pitch angle of one of the rotor blades 22 or for measuring a loading acting on one of the rotor blades 22; generator sensors for monitoring the generator (e.g., torque, rotational speed, acceleration and/or the power output); and/or various wind sensors for measuring various wind parameters. In addition, the sensors 65, 66, 67 may be located near the ground of the wind turbine, on the nacelle, or on a meteorological mast of the wind turbine.

It should also be understood that any other number or type of sensors may be employed and at any location. For example, the sensors may be analog sensors, digital sensors, optical/visual sensors, accelerometers, pressure sensors, angle of attack sensors, vibration sensors, MIMU sensors, fiber optic systems, temperature sensors, wind sensors, Sonic Detection and Ranging (SODAR) sensors, infra lasers, Light Detecting and Ranging (LIDAR) sensors, radiometers, pitot tubes, rawinsondes, and/or any other suitable sensors. It should be appreciated that, as used herein, the term "monitor" and variations thereof indicate that the various sensors of the wind turbine may be configured to provide a direct measurement of the parameters being monitored or an indirect measurement of such parameters. Thus, the sensors 65, 66, 67 may, for example, be used to generate signals relating to the parameter being monitored, which can then be utilized by the controller to determine the actual condition.

As mentioned, the processor(s) 58 is configured to perform any of the steps of the methods according to the present disclosure. For example, the processor 58 may be configured to determine the operational usage for the wind turbine 10. As used herein, "operational usage" generally refers to the number of operating seconds, minutes, hours, or similar that the wind turbine 10 and or its various components has operated at various operational parameters and/or under certain conditions. Such operational parameters that may be considered or tracked may include, for example, one or more of the following: power output, torque, pitch angle, a loading condition, generator speed, rotor speed, wind direction, air density, turbulence intensity, wind gusts, wind shear, wind speed, wind upflow, an amount of yawing, an amount of pitching, or temperature. Moreover, the operational data may include sensor data, historical wind turbine operational data, historical wind farm operational data, historical maintenance data, historical quality issues, or combinations thereof. Thus, the processor 58 may also be configured to record and store the operational usage in the memory store 60 for later use. For example, the processor 58 may store the operational usage in one or more look-up tables (LUTs). Moreover, the operational usage may be stored in the cloud.

Figure 4:
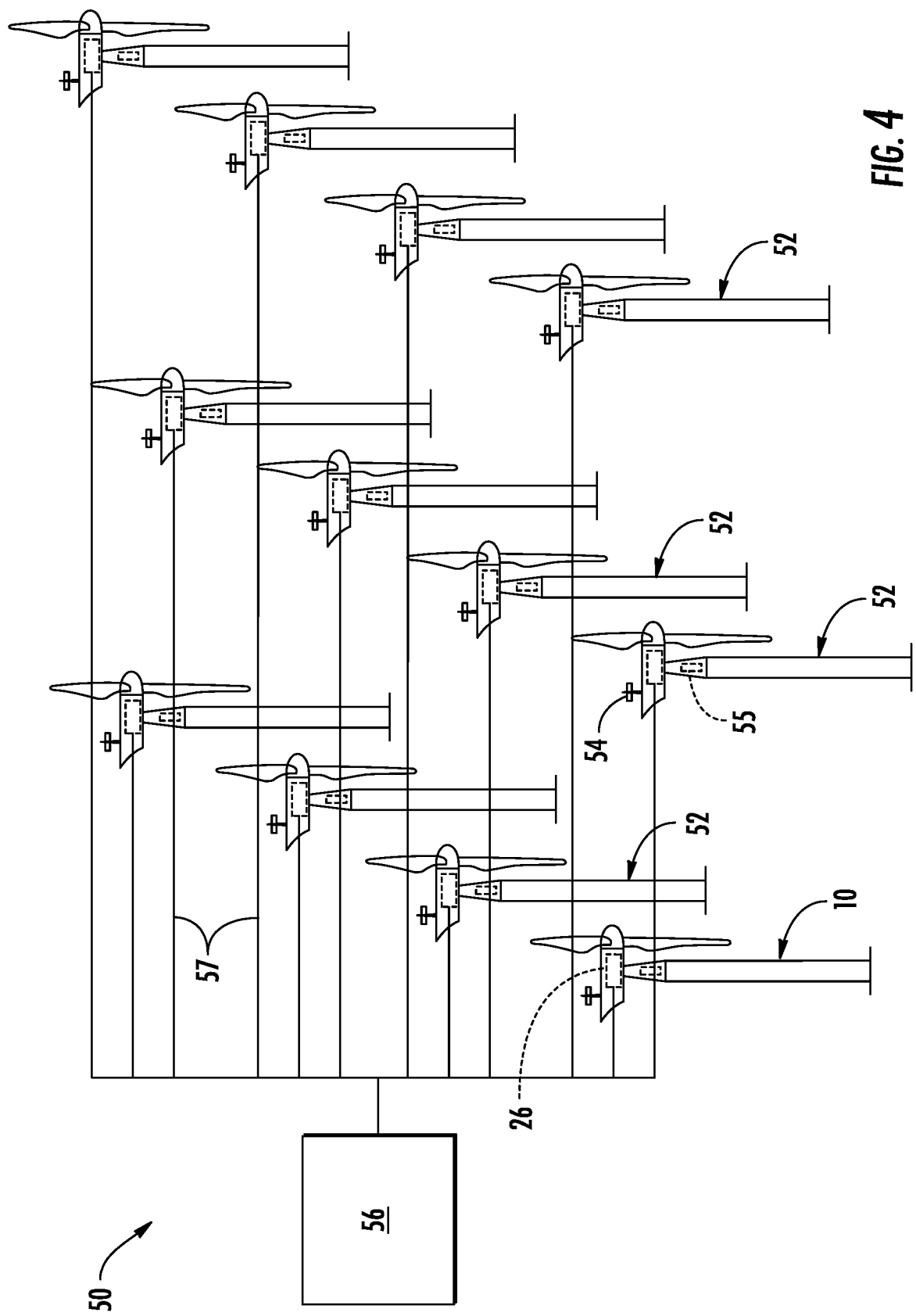
FIG. 4 illustrates a wind farm having a plurality of wind turbines according to the present disclosure.

Referring now to FIG. 4, the system and method as described herein may also be combined with a wind farm controller 56 of a wind farm 50. As shown, the wind farm 50 may include a plurality of wind turbines 52, including the wind turbine 10 described above. For example, as shown in the illustrated embodiment, the wind farm 50 includes twelve wind turbines, including wind turbine 10. However, in other embodiments, the wind farm 50 may include any other number of wind turbines, such as less than twelve wind turbines or greater than twelve wind turbines. In one embodiment, the controller 26 of wind turbine 10 may be communicatively coupled to the farm controller 56 through a wired connection, such as by connecting the controller 26 through suitable communicative links 57 (e.g., a suitable cable). Alternatively, the controller 26 may be communicatively coupled to the farm controller 56 through a wireless connection, such as by using any suitable wireless communications protocol known in the art.

In several embodiments, one or more of the wind turbines 52 in the wind farm 50 may include a plurality of sensors for monitoring various operating parameters/conditions of the wind turbines 52. For example, as shown, one of the wind turbines 52 includes a wind sensor 54, such as an anemometer or any other suitable device, configured for measuring wind speeds. As is generally understood, wind speeds may vary significantly across a wind farm 50. Thus, the wind sensor(s) 54 may allow for the local wind speed at each wind turbine 52 to be monitored. In addition, the wind turbine 52 may also include an additional sensor 55. For instance, the sensors 55 may be configured to monitor electrical properties of the output of the generator of each wind turbine 52, such as current sensors, voltage sensors, temperature sensors, or power monitors that monitor power output directly based on current and voltage measurements. Alternatively, the sensors 55 may comprise any other sensors that may be utilized to monitor the power output of a wind turbine 52. It should also be understood that the wind turbines 52 in the wind farm 50 may include any other suitable sensor known in the art for measuring and/or monitoring wind conditions and/or wind turbine conditions.

Figure 5:
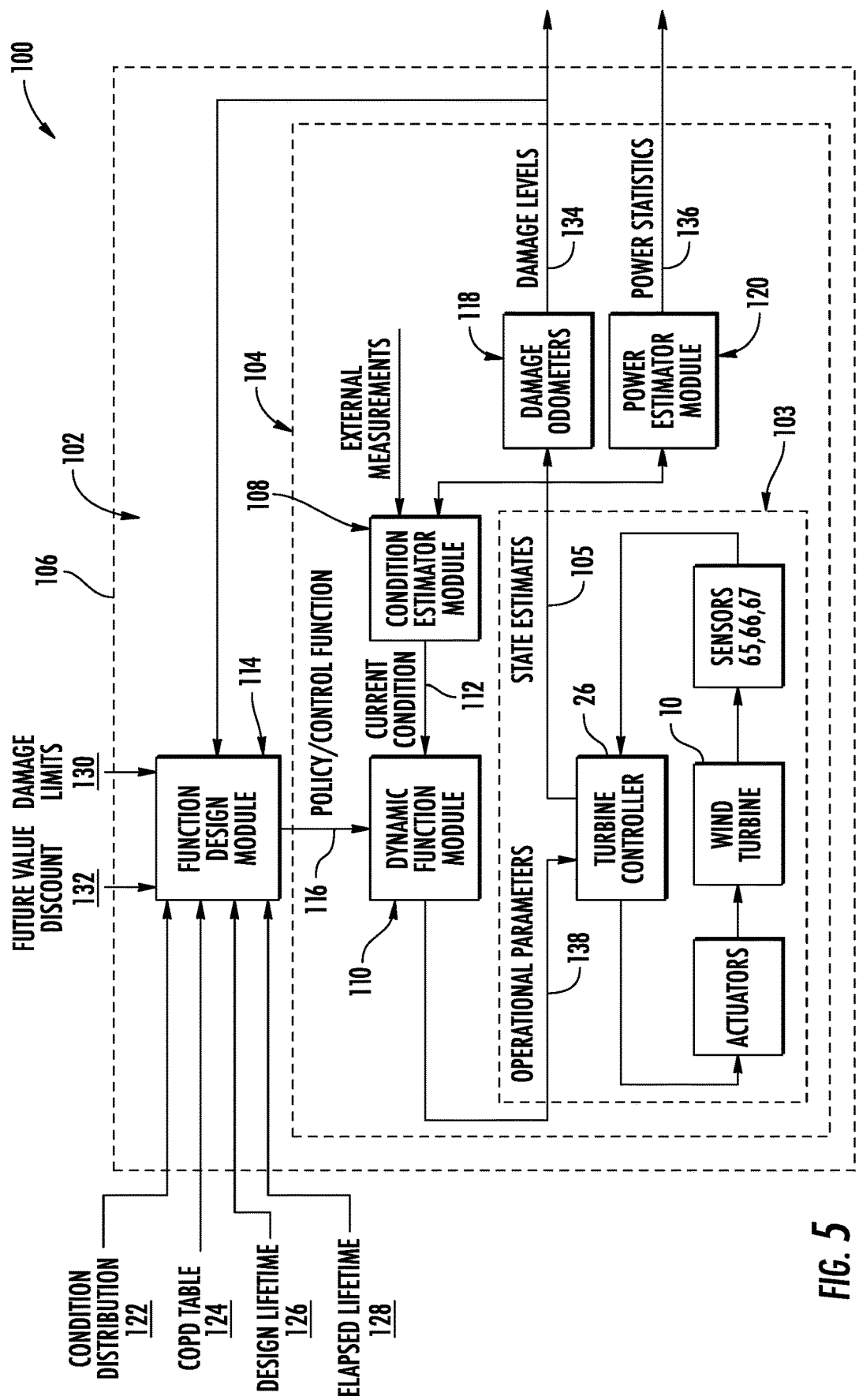
FIG. 5 illustrates a block diagram of one embodiment of a system for controlling a wind turbine connected to an electrical grid according to the present disclosure.

Referring now to FIGS. 5-13, various features of multiple embodiments of a odometer-based control (OBC) system 100 and method 200 for controlling a wind turbine, such as wind turbine 10, are presented in accordance with aspects of the present disclosure. More specifically, FIG. 5 illustrates a block diagram of one embodiment of system 100 for controlling the wind turbine 10 according to the present disclosure. For example, as shown, the OBC system 100 includes the turbine controller 26 and a supervisory controller 102 communicatively coupled to the turbine controller 26. In particular, as shown, the turbine controller 26 may be part of an inner control loop 103 that includes the wind turbine control system. In such embodiments, the wind turbine 10 may include one or more sensors read by the turbine controller 26, such as electrical components and accelerometers. Thus, the turbine controller 26 is configured to send control signals to actuators, such as blade pitch and nacelle yaw motors. The actuators affect turbine dynamic behavior. Therefore, the turbine controller 26 is configured to operate the wind turbine 10 to generate power while preventing undesired or damaging behavior. Moreover, the turbine controller 26 can have many operational parameters that may be set to alter or tune the turbine performance. The operational parameters are usually unchanged or changed in an ad hoc fashion during turbine operation, however, as will be described herein, the OBC system 100 can modify some of these parameters using an optimized policy or control function 116, as described herein below. Such operational parameters may include, for example, torque setpoint, speed setpoint, thrust limit, and/or parameters controlling when active pitching for rotor imbalance control is enabled. Moreover, the turbine controller 26 is configured to determine a state estimate 105 of the wind turbine 10, which is explained in more detail herein below.

Still referring to FIG. 5, the supervisory controller 102 may include a middle control loop 104 and an outer control loop 106. The middle control loop 104, or supervisory parameter control loop, is configured to improve turbine control and performance by changing turbine controller operational parameters based on estimates of the conditions, such as the wind or grid conditions. In particular, as shown, the middle control loop 104 may include a condition estimator module 108, a dynamic function module 110, one or more damage odometers 118, and a power estimator module 120.

Thus, in certain embodiments, the condition estimator module 108 is configured to estimate or predict the values of the condition parameters described herein based upon the state estimate 105, and possibly also external measurements. These condition parameters are generally referred to collectively herein as a current condition 112. In other words, the current condition 112 generally refers to the current estimate or prediction of the condition parameters in the condition parameter set, which are described herein in more detail below.

In addition, as shown, the damage odometer(s) 118 are configured to estimate damage levels of the various wind turbine components as a function of the state estimate 105 of the wind turbine 10. In general, each of the damage levels corresponds to a specific component and specific failure mode for that component. As such, the value of the damage level represents cumulative damage. Examples include blade root fatigue, tower base fatigue, and pitch bearing fatigue, though any number of damage levels may be generated and considered. In wind turbine design and siting, damage (generally fatigue) limits are often established to ensure safe and reliable operation. Thus, these limits can be based on damage models for the specific construction materials, manufacturing quality, and stress cycle counting and Goodman or similar damage curves.

Furthermore, the damage odometer(s) described herein may utilize the history of the state estimates from the turbine controller 26, and models of the wind turbine 10 and its components to determine damage done to the turbine based on its actual operation over its elapsed lifetime. Accordingly, the damage level for each component in the damage level set can be determined. In certain embodiments, there may be different damage odometers for different parts of the wind turbine 10, and there can be multiple damage odometers for a single part or component of the wind turbine 10, each associated with a different failure mode or wear mechanism. For example, many damage odometers are associated with crack propagation and fatigue failure modes of structural materials. In certain embodiments, damage odometers may be implemented based on the state estimate 105 from the turbine controller 26, where the state estimate includes instantaneous loads and forces on the wind turbine 10. In alternative embodiments, the damage odometers may also be based upon special sensors such as strain gauges (not shown). Moreover, in addition to damage levels, the damage odometers may produce an uncertainty level for each damage parameter that can be used by the function design module 114.

In further embodiments, damage assessment may utilize a fusion of damage odometers with a validated diagnostic algorithm, based on real-time operating signals or condition monitoring system. For example, if the pitch motor internal signals or generator acceleration signals suggest an abnormal operation, damage assessment would be high even if odometer reads low. Thus, the OBC system 100 may use both to assess real-time damage when addressing same failure mode.

In addition, in an embodiment, the power estimator module 120 is configured to compute statistics of the power production of the wind turbine 10. In certain embodiments, this computation will simply be the cumulative energy produced but may also include other cumulative statistics or statistics computed for each dynamic control interval. Accordingly, the power statistics 136 may be used to externally evaluate turbine performance, or to learn the power production performance of the wind turbine 10.

Still referring to FIG. 5, the current condition 112 from the condition estimator module 108 can then be used by the dynamic function module 110 to set operational parameters for the next time dynamic control interval. The condition estimator module 108 may also simply produce an estimate of the current condition parameters (not a prediction). If the dynamic control interval is relatively short, such as 30 seconds or one minute, this can be adequate. The condition estimator module 108 may also produce a prediction of condition parameters for the next time dynamic control interval. Predicting the future values of the condition parameters becomes more desirable when the dynamic control interval is longer.

Accordingly, the dynamic function module 110 is configured to change the operational parameters for the turbine controller 26, depending on the current condition 112. In certain embodiments, the dynamic function module 110 may include a lookup operation where the current condition is received and used to determine the operational parameters from the policy table. Thus, in certain embodiments, the dynamic function module 110 changes the operational parameters each dynamic control interval. As used herein, the dynamic control interval generally refers to the time duration for which the dynamic function module 110 sets the operational parameters.

Moreover, in particular embodiments, the outer control loop 106, or odometer-based control loop, further includes a function design module 114 for generating a policy or control function 116. Further, the function design module 114 is also configured to update the control function 116, based on the current fatigue damage state, expected future conditions, a system model of the turbine, planned operation horizon, and possibly expected future value of produced electricity.

In an embodiment, for example, the control function 116 defines a relationship of the set of condition parameters with at least one operational parameter of the wind turbine 10. More particularly, the control function 116 may be a mapping from condition parameters in the condition parameter set to operational parameters in the operational parameter set that is essentially executed by the dynamic function module 110. Thus, in an embodiment, the control function 116 may be a look up table, an interpolated function, or have any other functional form. In one embodiment, the control function 116 may be a constant policy, whereby the operational parameters are the same for any values of the condition parameters. This is equivalent to not having a middle loop. Another simple example of the control function 116 is one that stipulates a higher torque (for more power) when air density is below a threshold and wind speed is less than 15 m/s. But in general, the control function 116 is an arbitrary function of the current condition 112, may be complex. Thus, in many embodiments, the control function 116 may be determined by an optimization process in the function design module 114 block.

Furthermore, in certain embodiments, the control function 116 may be defined for discrete values of the condition parameters, and the current condition 112 may be continuous. In this case, the dynamic function module 110 may select the closest entry in the control function 116 from the current condition 112 to determine the operational parameters, or the dynamic function module 110 may interpolate the operational parameters. As such, the dynamic function module 110 receives the control function 116 from the function design module 114. Moreover, the dynamic function module 110 determines and sends operational parameters to the turbine controller 26 to dynamically control the wind turbine 10 based on the current condition 112 and the control function 116 for multiple dynamic control intervals.

Still referring to FIG. 5, the function design module 114 is configured to determine the control function 116 through an optimization process, for example, using a condition distribution 122, a model 124 of operational behavior of the wind turbine 10, a design lifetime 126 of the wind turbine 10 (e.g., the total time over which the wind turbine 10 is planned to operate), an elapsed lifetime 128 of the wind turbine 10 (e.g., the amount of time during the design lifetime for which the wind turbine 10 has operated thus far), one or more damage limits 130, the one or more damage levels 134 (e.g. from the damage odometers), and/or a future value discount 132 (e.g. the value of money in the future for value optimization). Such information represents the current state of the wind turbine 10 and the expected future conditions the wind turbine 10 will experience and a model of its operational behavior. Given these inputs there are a variety of optimization methods that may be used to produce the control function 116.

As used herein, the condition distribution generally refers to the expected future distribution of condition parameters in the condition parameter set. In one embodiment, for example, the condition distribution is a joint probabilistic distribution of the condition parameters. Thus, in an embodiment, if the condition parameter set consists of wind speed and turbulence intensity, the condition distribution may be a joint distribution of these two values. For practical reasons, the condition distribution may be instead independent distributions of each condition parameter, or some condition parameters may be assumed constant.

In certain embodiments, the condition distribution may be established for a wind turbine and wind farm before commission using, for example, met mast data. Furthermore, the condition distribution may be fixed and unchanging, or it may be adaptively learned and updated over time, as the wind turbine 10 operates.

In another embodiment, the model 124 of operational behavior of the wind turbine 10 may include a table of Condition parameters, Operational parameters, Power, and/or Damage (referred to herein as a COPD table 124), i.e., a model of power produced, and damage done to the wind turbine 10, depending on condition parameters and/or operational parameters. Therefore, in such embodiments, the model 124 may be a representation of the turbine operational behavior that models aspects of the turbine system response needed by the OBC system 100. In one embodiment, for example, the model may be a mapping from the condition parameters and the operational parameters to the expected power statistics 136 the wind turbine 10 will produce, and the expected increment to the damage values done to turbine components in a dynamic control interval. In other words, if wind and grid conditions are known and the operational parameters to be selected are known, then the model/table provides how much power the wind turbine 10 will produce and how much damage the wind turbine 10 will accumulate during one dynamic control interval. In such embodiments, the expected power statistics 136 of the wind turbine 10 may include power production, power factor, power stability of the wind turbine 10, or similar.

There are several ways in which the model of operational behavior of the wind turbine 10 may be determined. For example, in one embodiment, the model of operational behavior of the wind turbine 10 can be determined using a simulation of the wind turbine 10, a design of experiments (DOE) process carried out by the wind turbine 10, adaptive learning as the wind turbine 10 operates, and/or combinations thereof.

Furthermore, in an embodiment, the function design module 114 is configured to use the design lifetime duration when designing the control function 116 to ensure that the expected damage done in the design lifetime is within the damage limits. It should be understood that the OBC system 100 can be used with newly installed wind turbines as well as an upgrade to existing wind turbines. Therefore, the design lifetime and the damage limits may be scaled appropriately.

In additional embodiments, the future value discount generally refers to the discount applied to revenue and optionally to the negative value of expense at times in the future. This may be represented simply as a discount rate. The future value discount may also more generally be represented as a specific discount for revenue and expense at future points in time. The future value discount may optionally be used by the function design module 114 to optimize value, especially in terms of net present value.

Figure 6:
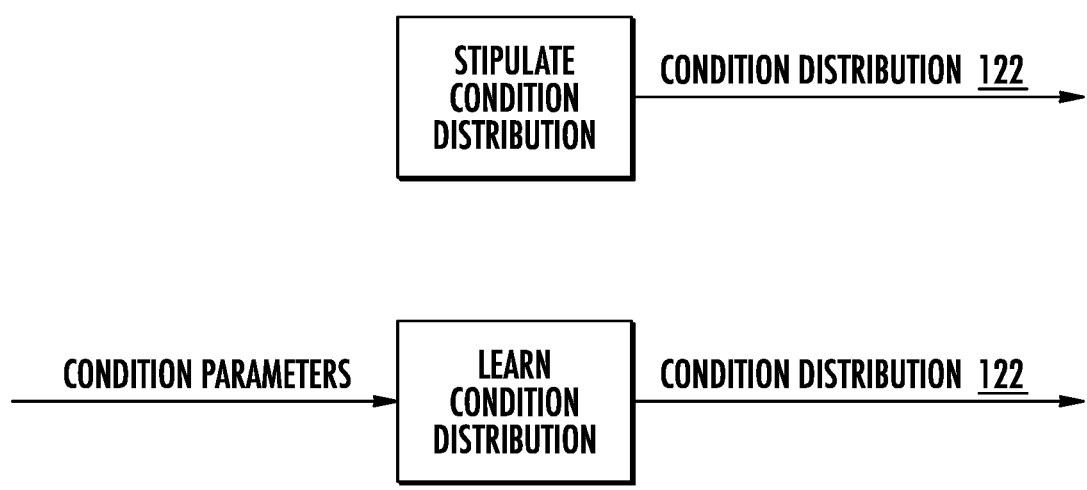
FIG. 6 illustrates a simplified block diagram of one embodiment of stipulating or leaning the condition distribution used by the system for controlling a wind turbine connected to an electrical grid according to the present disclosure.
Figure 7:
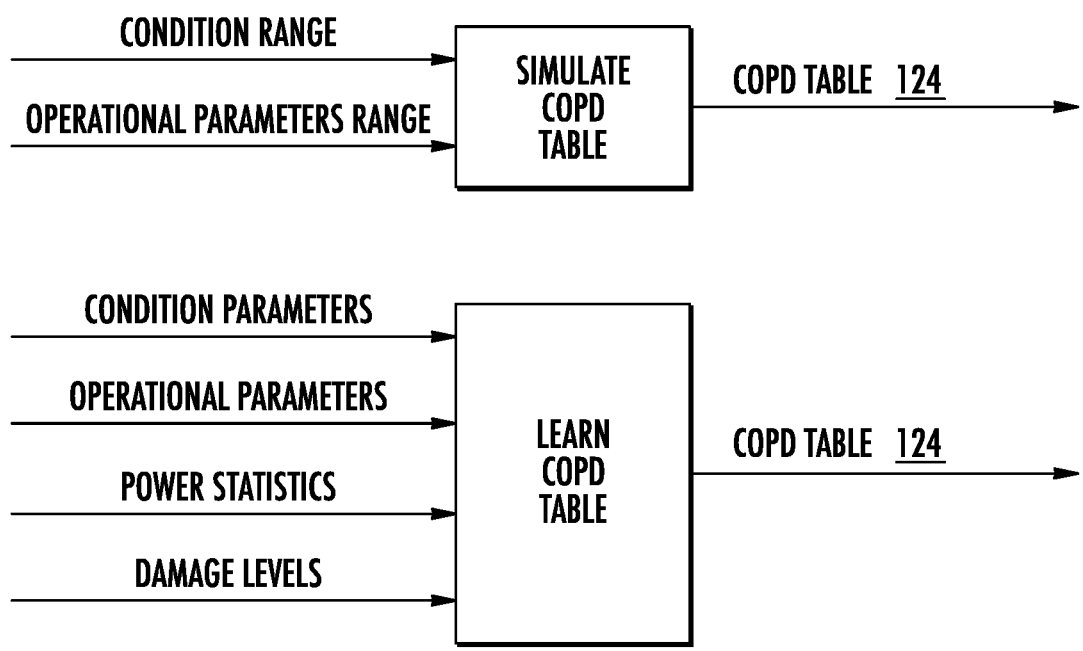
FIG. 7 illustrates a simplified block diagram of one embodiment of stipulating or leaning the COPD table used by the system for controlling a wind turbine connected to an electrical grid according to the present disclosure.

Referring now to FIGS. 6 and 7, an optional management and learning loop may be provided as an outermost control loop and contains initiation, adaptive learning, and business-level decision tasks. These few high-level components are optional and may be used irregularly. For example, in certain embodiments, the overall goal for how to operate the wind turbine 10 may change. A change of goal may be an adjustment of the design lifetime for the wind turbine 10, a change in a damage limit based on new material understanding or risk tolerance, a change in the future value discount, etc.

Referring particularly to FIG. 6, as an example, the condition distribution 122 may be a probabilistic distribution of expected future wind and grid conditions. In such embodiments, the condition distribution 122 may include wind velocity, turbulence, shear, and grid voltage. Furthermore, as shown in FIG. 6, the condition distribution 122 may be stipulated as an assumption based on some agreement or external study, or it can be learned continuously online as the wind turbine 10 operates.

As mentioned, there are multiple methods to produce the COPD table 124. More specifically, as shown in FIG. 7, the COPD table 124 may be produced via dynamic simulation of wind turbine operation. Wind turbine simulations may be carried out for all the operational parameter choices in the operational parameter set, and a range of values for the parameters in the condition parameter set. Thus, the simulations are configured to produce the value for each parameter in the power statistic parameter set and the damage level for each of the parameters in the damage level set.

Alternatively, the COPD table 124 may be determined or partially updated using measurements from the wind turbine 10 during a DOE process. This approach eliminates the simulation and potentially produces a more accurate empirical COPD table 124 specific to the wind turbine 10. In such embodiments, rather than generating the control function 116, the OBC system 100 sets the operational parameters to the choices in the operational parameter set. As the turbine operates, the condition parameters, the operational parameters 138, the power statistics 136, and the damage levels 134 are collected and used to produce or partially update the COPD table 124.

In still another embodiment, the COPD table 124 may be determined using measurements from the wind turbine 10 during normal operation. This method is similar to the DOE method, but instead of a structured DOE process for setting the values of the operational parameters, the wind turbine 10 operates normally. As the wind turbine 10 operates, the same data is collected and used to produce the COPD table.

The COPD table 124 may also produce uncertainty levels for its outputs and the damage levels 134 may have associated uncertainty from the damage odometers 118, which can also be used by the function design module 114. As such, the function design module 114 may produce a control function with or without regard to uncertainty and have an optimization goal to maintain damage levels below damage limits based on a point estimates of damage from the COPD table and damage levels from the damage odometers 119. Alternatively, the function design module 114 may utilize the uncertainty and have an optimization goal to keep damage levels below the damage limits with some specified probability.

Furthermore, the OBC system 100 may be restricted with respect to which operational parameters are allowed. Such restriction may assist in avoiding unstable or damaging modes of turbine operation, for simpler turbine operation, for practical operational parameter management reasons, or to simplify the COPD table. When this is the case, the operational parameters designate the finite set of allowable operational parameters. The operational parameters may apply only to the COPD table, so the COPD table is defined only for operational parameters in the selected operational parameter set. In this case, the function design module 114 may still interpolate between these elements to find other operational parameters on the continuum. The operational parameter set may also apply to the function design module 114, in which case the function design module 114 will produce a control function where the selected operational parameters are always in the operational parameter option set.

Figure 8:
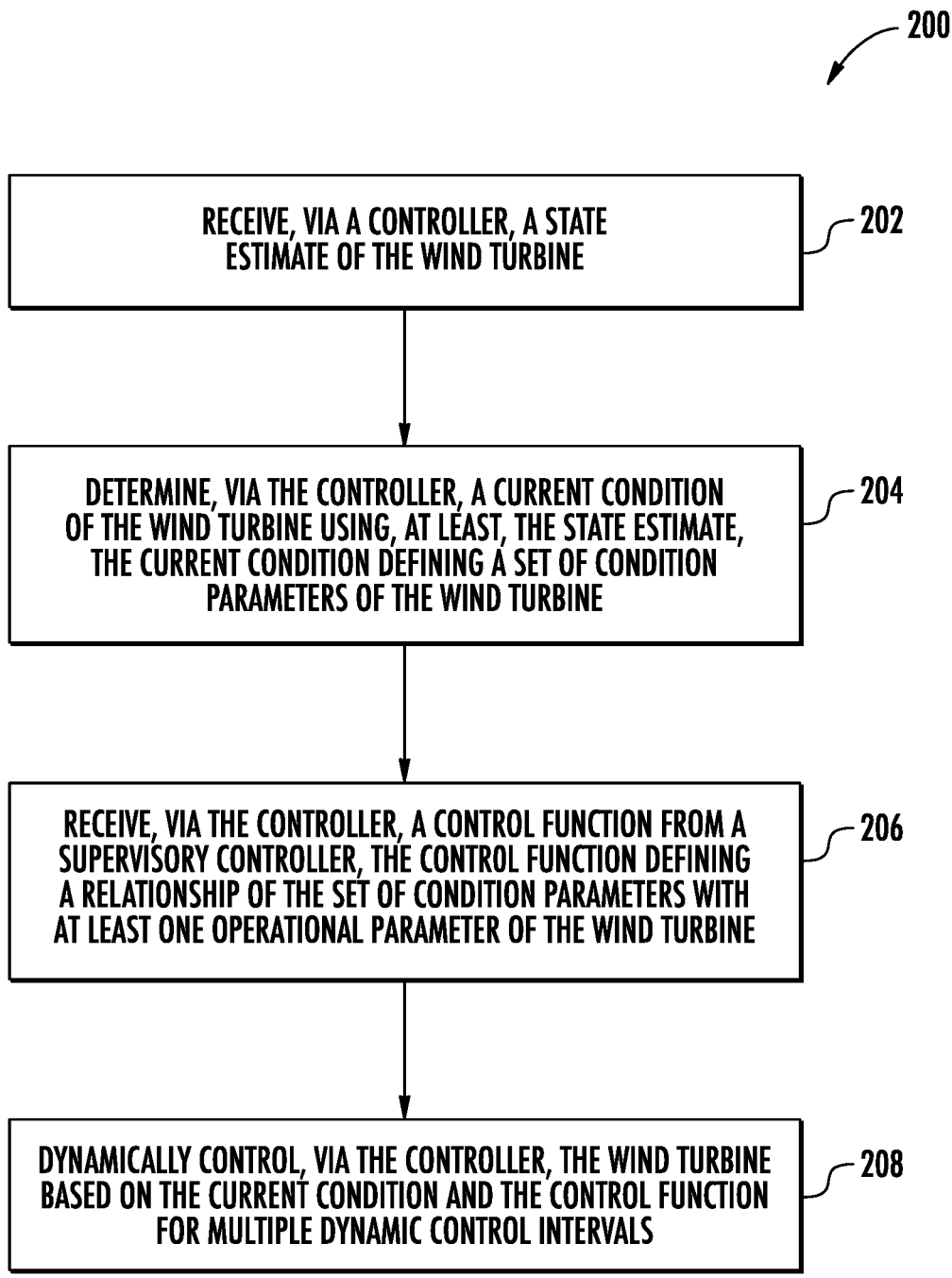
FIG. 8 illustrates a flow chart of one embodiment of a method for controlling a wind turbine connected to an electrical grid according to the present disclosure.

Referring now to FIG. 8, a flow diagram of one embodiment of the method 200 for controlling a wind turbine connected to an electrical grid is illustrated in accordance with aspects of the present disclosure. The method 200 is described herein as implemented using, for example, at least one of the wind turbines 52 of the wind farm 50 described above, such as wind turbine 10. However, it should be appreciated that the disclosed method 200 may be implemented using any other suitable wind turbine now known or later developed in the art. In addition, although FIG. 8 depicts steps performed in a particular order for purposes of illustration and discussion, the methods described herein are not limited to any order or arrangement. One skilled in the art, using the disclosures provided herein, will appreciate that various steps of the methods can be omitted, rearranged, combined and/or adapted in various ways.

As shown at (202), the method 200 includes receiving, via a controller, a state estimate 105 of the wind turbine 10. In particular, the turbine controller 26 of the wind turbine 10 may include a computer model configured to continuously estimate the state of the turbine 10 as a high-dimensional vector. As such, the state estimate 105 can include the dynamic motion, elastic deformation, and mechanical stress of all major components. At all times, the turbine controller model may estimate the position, velocity, and acceleration of the turbine components, including blade bending, tower bending, blade twist, and main shaft rotation and torque. Accordingly, the turbine controller 26 operates the wind turbine 10 to maintain the turbine within limits. Thus, the state estimate 105 can be used by the OBC system 100 to assess loads and cumulative damage to turbine components using damage odometers. In addition, the state estimate 105, can be used by the OBC system 100 to calculate condition parameters using the condition estimator module 108. It should be further understood that the state estimate 105 may be estimated by a separate controller apart from the turbine controller 26. Moreover, in an embodiment, the state estimate 105 may include direct or filtered copies of the sensor measurements. These direct or filtered sensor measurements can be incorporated into the state estimate 105 for notational convenience.

Referring still to FIG. 8, as shown at (204), the method 200 includes determining, via the controller, a current condition 112 of the wind turbine 10 using, at least, the state estimate 105. In an embodiment, as an example, the current condition 112 may define a set of condition parameters of the wind turbine 10 that relate to the wind conditions, electrical grid conditions, and/or other external conditions the wind turbine 10 is experiencing or will experience in the near or immediate future. It should be understood that the specific set of condition parameters can vary and different configurations may be used for different turbine models or wind farms. For example, in particular embodiments, the condition estimator module 108 may receive one or more external measurements and determine the current condition of the wind turbine 10 using the state estimate 105 of the wind turbine 10 and the external measurement(s). In such embodiments, the external measurement(s) may include measurements or data from sources other than the turbine controller state estimate, such as a wind conditions from an anemometer, a met mast, LIDAR, or measurements from other wind turbines.

In particular embodiments, the condition parameters include the estimates, predictions, and/or measurements of characteristics of the wind and/or grid conditions used by the turbine controller 26 to determine how to operate the turbine. Examples of these aspects include wind speed or functions thereof, wind direction, turbulence, ambient or air temperature, humidity, wind shear, wind veer, an operating state of the wind turbine, one or more grid conditions.

In such embodiments, the grid condition(s) may include, for example, grid power factor, grid voltage, or grid current. In certain embodiments, certain grid conditions may cause the wind turbine 10 to derate or create a higher amount of reactive power that may affect the maximum power that could normally be produced from the wind turbine 10. Grid conditions can also include cumulative turbine power limits (i.e., point of interconnection limit) within the wind farm 50 where this would ultimately affect the individual wind turbines power producing capability. Therefore, such grid conditions can be important to consider.

Moreover, the operating state of the wind turbine 10 generally refers to the state at which the wind turbine 10 is operating and may include, for example, normal power production mode, start-up, shutdown, and/or run-up. Therefore, such operating states can assist with determining whether the OBC system 100 is activated. In addition, certain environmental conditions affecting normal operation and power producing capability of the wind turbine 10 can be included and considered. An example occurrence is electrical derating of the power converter from excessive ambient temperatures. Conflicting conditions may occur where a maximum limit dictated by environmental conditions may affect various setpoints of the OBC system 100.

Referring still to FIG. 8, as shown at (206), the method 200 includes receiving, via the controller, a control function 116 from the supervisory controller 102. For example, in an embodiment and as previously mentioned, the control function 116 may include a look-up table, a mathematical function, or similar. In such embodiments, the control function 116 defines a relationship of the set of condition parameters with at least one operational parameter of the wind turbine 10. Moreover, in an embodiment, the operational parameters generally refer to any operational parameters of the wind turbine 10 that can be modified to adjust operation thereof. In certain embodiments, example operational parameters may include rotor torque setpoint, rotor speed setpoint, pitch angle adjustments, and/or parameters that stipulate the degree of adaptive pitch control for rotor balancing.

In such embodiments, the method 200 may also include determining, via the function design module 114, the control function 116 based on the condition distribution, the model of operational behavior of the wind turbine 10 (e.g., the COPD table), the design lifetime of the wind turbine 10, the elapsed lifetime of the wind turbine 10, the damage limits, the damage levels, and/or the future value discount as described herein.

As shown at (208), the method 200 includes dynamically controlling, via the controller, the wind turbine 10 based on the current condition 112 and the control function 116 for multiple dynamic control intervals. For example, in particular embodiments, dynamically controlling the wind turbine 10 based on the current condition 112 and the control function 116 for each of the multiple dynamic control intervals may include dynamically changing, via the dynamic function module 110, the operational parameters of the wind turbine 10 based on the current condition 112 and the control function 116 for each of the multiple dynamic control intervals. In one embodiment, for example, the dynamic function module 110 can modify operational parameters that enable a trade-off between energy production and damage, or between damage to different components.

One example implementation of the function design module 114 is with respect to the annual energy production (AEP) optimization, which may be used to repeatedly solve for the function that maximizes total energy production and maintains the damage levels below their limits. As such, the OBC system is configured to provide all of the updated turbine operation and condition information needed by AEP optimization. In such embodiments, the total energy production may be determined using the COPD table with the condition parameters dictated by the condition distribution, the operational parameters determined by the control function 116, and the resulting power generated evaluated over the operating lifetime. Similarly, the total damage for each damage level is determined using the COPD table and the resulting damage for each damage level is evaluated over the operating lifetime. In certain embodiments, the following constrained stochastic optimization represented by Equation (1) may be solved:

$$\max_{u=k(w)} \int f_{power}(u, w) * p(w)dw \qquad \text{Equation (1)}$$

$$\text{s.t.} \quad (t_d - t_s) * \int f_{power}(u, w) * p(w)dw + D_c \leq D_l$$

wherein u is the operational parameter vector,
w is the condition parameter vector,
p(w) is the joint probabilistic distribution of condition parameter vector,
$f_{power}$ is a scalar function of generated power,
$f_{damage}$ is a vector function of damage rates on different turbine components,
$t_d$ is the designed turbine life,
$t_e$ is the elapsed turbine life,
$D_c$ is the current damage levels,
$D_l$ is the damage limits, and
k(w) is the optimal policy or control function to be solved.

Typically, the function design module 114 designs a control function 116 to maximize AEP, while keeping all damage levels below damage limits. An alternative is to minimize one of the damage levels while keeping all other damage levels below their respective damage limits. Further, the function design module 114 may choose to design the control function 116 to minimize a weighted sum of several damage levels while keeping all other damage levels below their respective damage limits. The AEP optimization method readily supports this alternative goal. To implement the damage optimization, one needs to modify the objective of AEP optimization in Equation (2) as follows:

$$\max_{u=k(w)} \sum_i \int s_i * f^i_{damage}(u, w) * p(w)dw \qquad \text{Equation (2)}$$

Wherein $f^i_{damage}$ is the $i^{th}$ damage or failure mode the function design module 114 seeks to minimize, and
$s_i$ is the corresponding weight.

Figure 9:
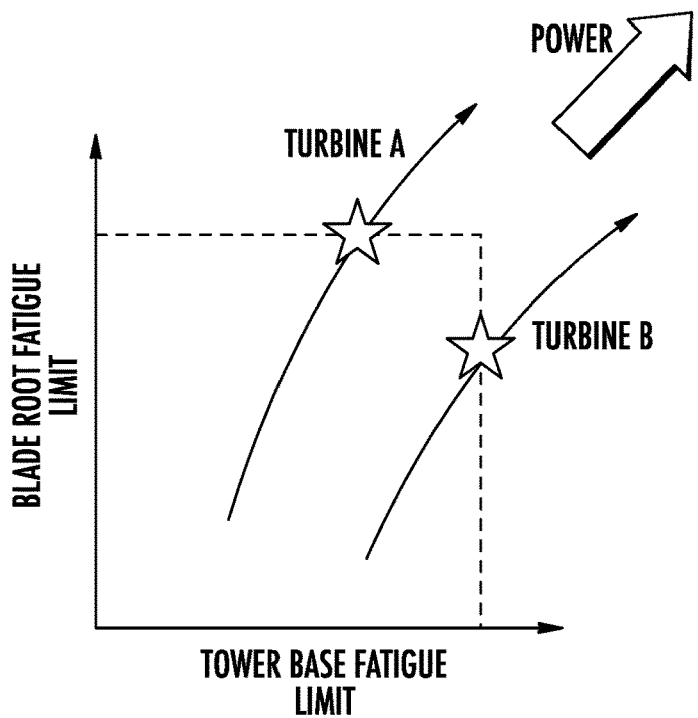
FIG. 9 illustrates a conceptual diagram of one embodiment of an example goal of the system for controlling a wind turbine connected to an electrical grid according to the present disclosure, particularly illustrating the system regulating the wind turbine to maximize power production while keeping damage levels below damage limits.
Figure 10:
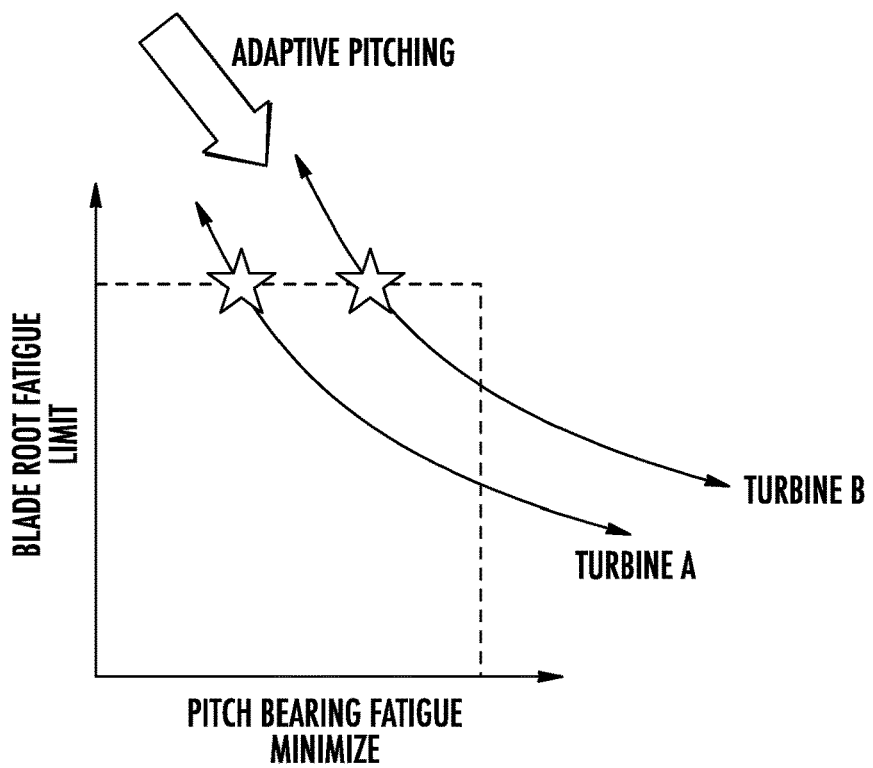
FIG. 10 illustrates a conceptual diagram of one embodiment of an example goal of the system for controlling a wind turbine connected to an electrical grid according to the present disclosure, particularly illustrating the system regulating the wind turbine to minimize certain aspect of damage while keeping other damage levels below damage limits.

Referring particularly to FIGS. 9 and 10, various graphs of application scenarios according to example embodiments of the present disclosure are illustrated, particularly depicting conceptual diagrams of maximizing AEP and minimizing one or more damage levels. In particular, FIG. 9 illustrates a graph in which the OBC system 100 may regulate the wind turbine 10 to maximize power production while maintaining damage levels below damage limits. Further, FIG. 10 illustrates a graph in which the OBC system 100 may regulate the wind turbine 10 to minimize certain aspect of damage while maintaining other damage levels below damage limits. Moreover, as shown, the dotted lines represents the design limits for each type of fatigue damage.

In further embodiments, it may be desirable to configure the OBC system 100 with a limited operational parameter range. In one embodiment, the operational parameters in the range can be selected so that the wind turbine 10 always produces at least a baseline level of power, but also, when conditions and cumulative damages are suitable, has an increased power level. This can be accomplished through an operational parameter option set, $u^{(i)} \in U$ with a small number of elements. In such embodiments, each element in the set may correspond to a different power model $f_{power}(u^{(i)}, w)$, also referred to as the power curve. The solution to Equation (1) is a control function that switches between power curves based on condition w. For example, if the operational parameter set includes only torque, the operational parameter set may include a few values of torque that result in a few different power curves.

To handle the COPD table uncertainty as well as to avoid frequent switching between different power curves, a penalty on power curve switching can be added to the objective function (taking the AEP optimization as an example) using Equation (3) below:

$$\max_{u=k(w)} \int f_{power}(u, w) * p(w)dw - (c, w) * \sigma(u, u_{now}) \quad \text{Equation (3)}$$

wherein $u_{now}$ is the currently implemented operational parameter, $$\sigma(u, u_{now}) = \begin{cases} 1, u = u_{now} \\ 0, \text{othewise} \end{cases}, c(w) > 0$$

is the penalty of switching power curves at condition w, which is based on the COPD model uncertainty level.

Figure 11:
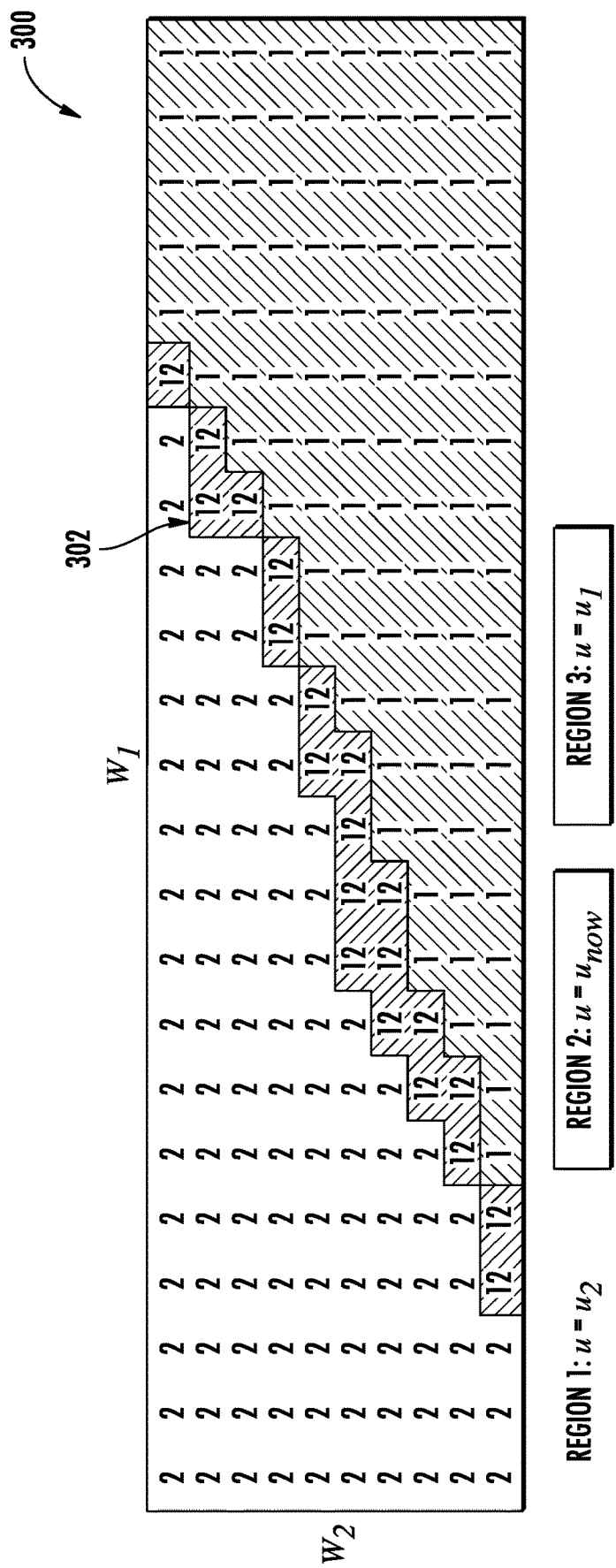
FIG. 11 illustrates a graph of one embodiment of an optimized power curve policy with a hysteresis band for the system for controlling a wind turbine connected to an electrical grid according to the present disclosure.

In such embodiments, introducing the penalty term results in a hysteresis region in the optimized policy. An illustrative example of the optimized power curve policy 300 with the hysteresis band 302 is illustrated in FIG. 11. In particular, as shown, the illustrated QPC policy 300 includes an operation parameter option set having two elements $\{u_1, u_2\}$ and two condition parameters $\{w_1, w_2\}$, with $\{w_1, w_2\}$ corresponding to wind speed and turbulence intensity, respectively, and are discretized by a 23×10 grid.

In another embodiment, the function design module 114 may design the control function 116 using fatigue limited AEP optimization. In such embodiments, the function design module 114 may design the control function 116 by relaxing the hard constraint on the turbine design life, e.g., by replacing the hard constraint with a soft constraint of maximizing energy during design life. Such an objective naturally avoids reducing the design life, due to lost energy/part replacement cost after the failure. However, if more energy early in life outweighs such penalty, the function design module 114 is free to target a shorter turbine life. This also benefits numerical stability of the function design module 114, since it avoids infeasibility and non-convergence, as the function design module 114 always starts in a feasible region, owing to removal of a hard constraint.

$$\max_{u=k(w),L} L * \int f_{power}(u, w) * p(w)dw \quad \text{Equation (4)}$$

$$\text{where } L = \min\left(t_d - t_e, \frac{(D_l \leq D_c)}{\int f_{power}(u, w) * p(w)dw}\right)$$

wherein L is the remaining turbine life to be optimized. It could be shorter than $t_d - t_e$.

To get a fast solution online, a (stochastic) gradient ascent-based update approach can also be adopted, whereby the sensitivity of the objective to policy is computed and the policy is updated using a first order gradient ascent or Newton-Raphson's method at each time step. Over time, such a hill climbing approach is expected to reach a local optimum and adapt to changing conditions. This method provides an alternative to the aforementioned methods to simplify the optimization process. It allows the function design module 114 to be implemented at the dynamic function module level.

In addition to the constrained AEP optimization set forth in Equation (1), the control function 116 can also be obtained by simultaneously maximizing generated power and minimizing damage rate, which leads to the multi-objective optimization set forth in Equation (5) below:

$$\max_{u=k(w)} \int (f_{power}(u, w) - \lambda^T * f_{damage}(u, w)) * p(w)dw \quad \text{Equation (5)}$$

wherein $\lambda$, is a user-defined cost vector of the damage rates, which could be dependent on the odometer levels and damage limits.

Figure 12:
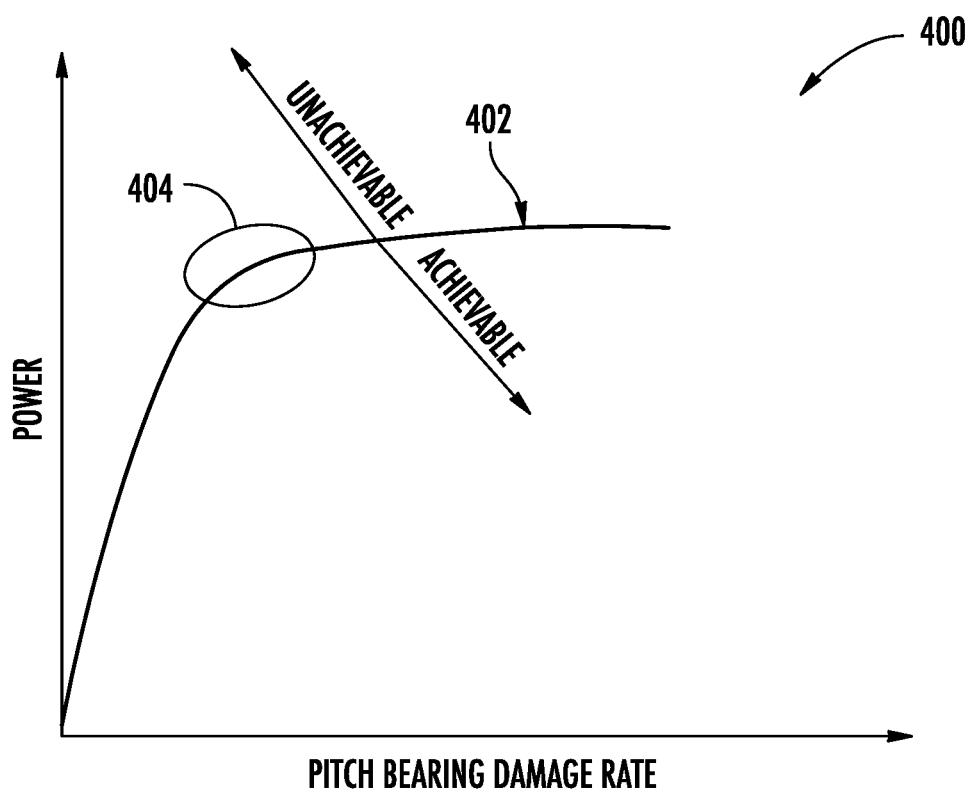
FIG. 12 illustrates a graph of power (y-axis) versus pitch bearing damage rate (x-axis) according to the present disclosure, particularly illustrating an optimal trade-off curve that provides the optimal trade-off between generated power and the damage rate.

In one embodiment, $\lambda$ may be selected to be the Karush-Kuhn-Tucker (KKT) multipliers of the AEP optimization of Equation (1), then the unconstrained optimization above is equivalent to the AEP optimization. However, in practice, the KKT multipliers cannot be known a priori. Therefore, a practical approach is to obtain a trade-off curve/surface by solving a series of optimizations with varying values of $\lambda$. For example, as shown in FIG. 12, a graph 400 of power (y-axis) versus pitch bearing damage rate (x-axis) according to the present disclosure is illustrated, particularly illustrating an optimal trade-off curve 402 that provides the optimal trade-off between generated power and the damage rate. Thus, FIG. 12 provides an illustrative example of how the trade-off curve 402 can be used to find policies/control functions which operate the wind turbine 10 in an ideal operating region 404.

In yet another embodiment, the multi-objective optimization can be modified to directly maximize the profit of the turbine operation, as represented by Equation (6) below:

$$\max_{u=k(w)} \int (c_{power} * f_{power}(u, w) - c_{damage}^T * f_{damage}(u, w)) * \quad \text{Equation (6)}$$

$$p(w)dw$$

Wherein $c_{power}$ is the unit electricity price; and $c_{damage}$ is the maintenance cost or estimated cost associated with each damage mode.

To account for the future value discount, a discount factor, $0 < p < 1$, may be applied to the optimization:

$$\max_{u=k(w,t)} \int_{t=t_e}^{t=t_d} \rho^{t-t_e} \int (c_{power} * f_{power}(u, w) - \quad \text{Equation (7)}$$

$$c_{damage}^T * f_{damage}(u, w)) * p(w)dw \, dt$$

Note that the future value discount leads to a time-varying policy $u=k(w, t)$ for $t=[t_e, t_d]$. In such embodiments, this policy tends to operate the wind turbine 10 more aggressively in the near future by generating more power and damage and more conservatively towards the end of turbine design life.

In yet another embodiment, the function design module 114 may select and produce a policy from a fixed set of candidate policies. The set of candidate policies may be designed or selected manually. For example, the policies in this set may correspond to two different power curves or other operational parameter settings known to work well for the wind turbine 10. In such embodiments, the function design module 114 selects a more aggressive policy when the damage accumulated is lower than expected and less aggressive policy when the damage accumulated is greater than expected. This selection may be based on the degree to which the worst-case damage ratio exceeds the lifetime ratio.

Figure 13:
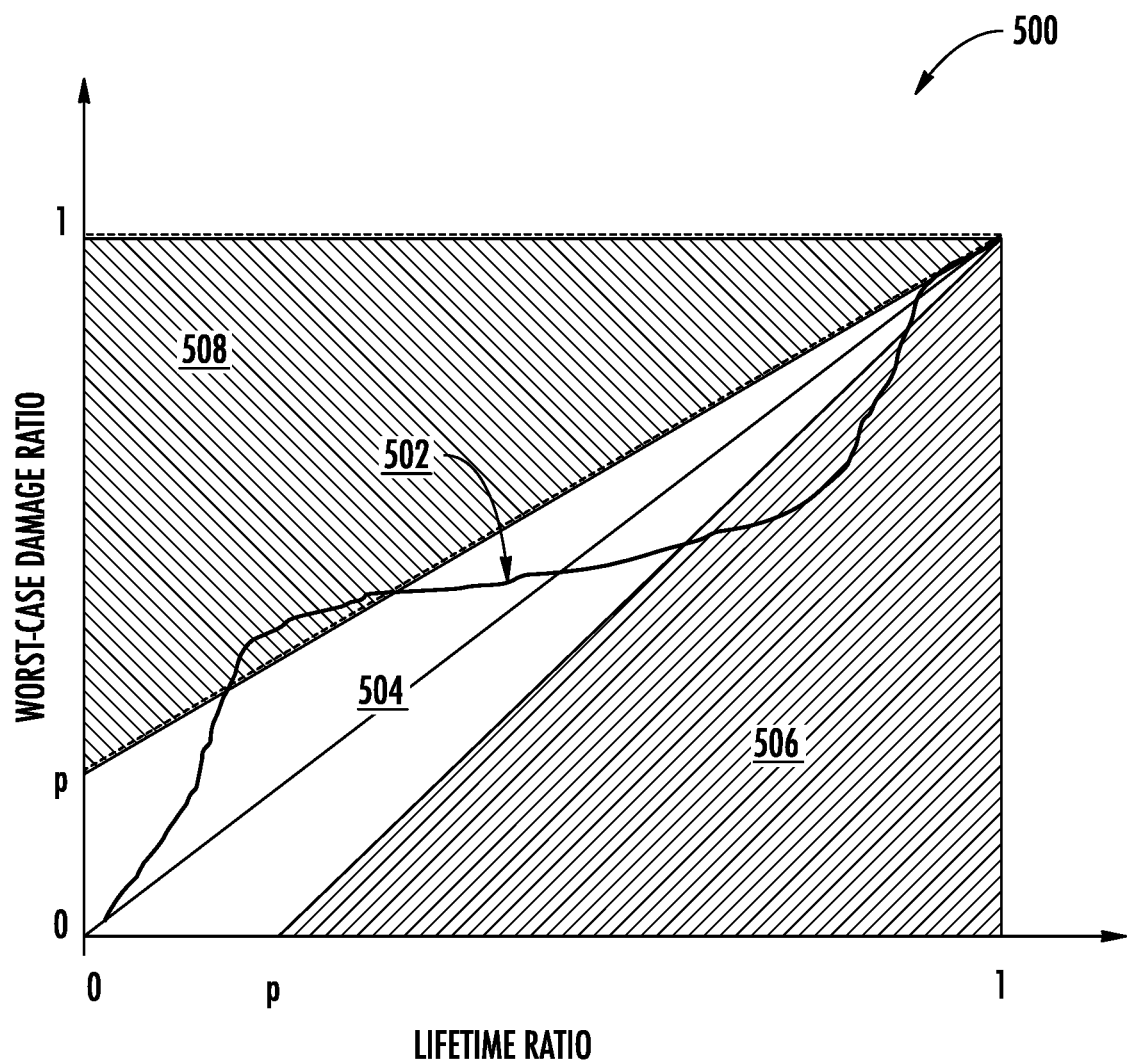
FIG. 13 illustrates a three-regions characteristic plot of one embodiment of worst-case damage ratio (y-axis) versus lifetime ratio (x-axis) according to the present disclosure.

Referring now to FIG. 13, the dynamic function module 110 may be augmented with a three-region mechanism to override the usual nominal policy. In particular, FIG. 13 illustrates a three-regions characteristic plot 500 of one embodiment of worst-case damage ratio (y-axis) versus lifetime ratio (x-axis). Further, as shown, if the lifetime time and worst-case damage ratio point or curve 502 falls in the middle region 504, it is assumed that damage progression is on track and the nominal policy determines the operational parameters. If the point or curve 502 falls in the lower region 506, it is assumed that damage is accumulating slowly, so the wind turbine 10 can operate more aggressively. Regardless of the policy, operational parameters selected to maximize production or achieve any other primary objective. If the point or curve 502 falls in the upper region 508, it is assumed that damage is accumulating too quickly, so the wind turbine 10 can be operated less aggressively. Regardless of the policy, operational parameters are selected to minimize damage accumulation to the damage parameter responsible for the worst-case damage ratio.

In still further embodiments, it may be desirable to design periodic policies which take into account periodic operating conditions, e.g., caused by periodically changing conditions due to diurnal or seasonal variation of wind aspects, energy market price, etc. For example, to account for periodic variation of wind aspects, p(w,s) is used in place of p(w) in the above equations and the optimization is solved over multiple dynamic control intervals in a period. In such embodiments, the objective function could be changed to Equation (8) below:

$$\max_{u=k(w,t)} \frac{1}{T}\int_0^T \int f_{power}(u, w) * p(w, t) dw\, ds \quad \text{Equation (8)}$$

$$\text{s.t.} \quad (t_d - t_e) * \frac{1}{T}\int_0^T \int f_{damage}(u, w) * p(w, s) dw\, ds + D_c \leq D_l$$

wherein T is one day or one year,
p(w, s) is periodic with respect to s with a period of T.

Similarly, the energy price $c_{power}$ in Equations (6) and (7) may incorporate the diurnal/seasonal forecasted distribution of energy price.

While the above optimization process includes the COPD table and the condition distribution, the COPD table and the condition distribution may not need to be explicitly computed or stored as part of the optimization process. Instead, the policy/control function 116 may be learned by tracking an estimate of the overall objective function, which may be a time expectation of the COPD table over the condition distribution and its dependency on a different policy. These variations may be achieved by applying methods such as stochastic optimization.

As an example, the OBC system 100 may set the wind turbine 10 to run policy A for a period consisting of multiple dynamic intervals and track the cumulative damage and energy in this period. The OBC system 100 may then set the wind turbine 10 to repeat this process with a different policy, policy B. The difference in the objective function between policy A and B can then be compared to pick the better or more suitable policy. In addition, the difference may be used to generate a new policy C, and the process can be repeated to iterate through new policies.

Typically, all the operating points allowed for the function design module 114 satisfy extreme load and operational signals, such as temperature limits. In practice, estimates of such loads and signals are available, and there may be a need to adapt to their changes. This may happen because the simulation model may not exactly match the actual wind turbine, or because of unmodelled physics. e.g., if generator overtemperature during hot months or a clogged inlet results in a shutdown. In such instances, the function design module 114 is configured to curtail the wind turbine 10 to avoid shutdown in the first place. To ensure this, the function design module 114 may have approximate sensitivities of such operation signals with respect to control parameters and can continually monitor and penalize their exceedance in its control function 116.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind turbine connected to an electrical grid, the method comprising:
   determining, via a turbine controller, a state estimate by computer modeling a state of the wind turbine, wherein the state estimate defines dynamic motion, elastic deformation, and mechanical stress of the wind turbine;
   determining, via the turbine controller, a current condition of the wind turbine using, at least, the state estimate, the current condition defining a set of condition parameters of the wind turbine;
   receiving, via the turbine controller, a control function from a supervisory controller, the control function defining a relationship of the set of condition parameters with at least one operational parameter of the wind turbine; and
   dynamically controlling, via the turbine controller, the wind turbine based on the current condition and the control function for multiple dynamic control intervals.

2. The method of claim 1, wherein the set of condition parameters comprises characteristics of at least one of the electrical grid, wind, or an environment of the wind turbine, the set of condition parameters comprising at least one of wind speed, wind direction, wind shear, wind veer, turbulence, ambient temperature, humidity, an operating state of the wind turbine, or one or more grid conditions.

3. The method of claim 2, wherein the one or more grid conditions comprise at least one of grid power factor, grid voltage, or grid current.

4. The method of claim 1, wherein the set of condition parameters of the wind turbine are estimated, measured, predicted, or combinations thereof.

5. The method of claim 1, further comprising determining the state estimate using a high-dimensional vector, wherein the state estimate defines at least one of dynamic motion, elastic deformation, and mechanical stress of the wind turbine.

6. The method of claim 1, wherein determining the current condition of the wind turbine using, at least, the state estimate further comprises:
  receiving, via a condition estimator module, the state estimate of the wind turbine and one or more external measurements; and
  determining, via the condition estimator module, the current condition of the wind turbine using the state estimate of the wind turbine and the one or more external measurements.

7. The method of claim 1, wherein the control function comprises at least one of a look-up table or a mathematical function.

8. The method of claim 1, further comprising determining one or more damage levels of one or more components of the wind turbine using one or more damage odometers as a function of at least one of the state estimate of the wind turbine or one more sensors.

9. The method of claim 1, further comprising determining, via a function design module of the supervisory controller, the control function based on at least one of a condition distribution, a model of operational behavior of the wind turbine, a design lifetime of the wind turbine, an elapsed lifetime of the wind turbine, one or more damage limits, one or more damage levels, or a future value discount.

10. The method of claim 9, wherein the model of operational behavior of the wind turbine defines a mapping from the set of condition parameters of the wind turbine and the at least one operational parameter of the wind turbine to expected power statistics of the wind turbine and an expected increment to the one or more damage levels for each of the multiple dynamic control intervals.

11. The method of claim 10, wherein the expected power statistics of the wind turbine comprise at least one of a power production, power factor, or power stability of the wind turbine.

12. The method of claim 10, wherein the model of operational behavior of the wind turbine further defines an uncertainty level for outputs of the model.

13. The method of claim 9, further comprising determining the model of operational behavior of the wind turbine using at least one of simulation, machine learning, design of experiments, or combinations thereof.

14. The method of claim 1, wherein dynamically controlling the wind turbine based on the current condition and the control function for each of the multiple dynamic control intervals further comprises:
  dynamically changing, via a dynamic function module of the turbine controller, the at least one operational parameter of the wind turbine based on the current condition and the control function for each of the multiple dynamic control intervals.

15. A system for controlling a wind turbine connected to an electrical grid, the system comprising:
  a turbine controller for generating a state estimate of the wind turbine by computer modeling a state of the wind turbine, wherein the state estimate defines dynamic motion, elastic deformation, and mechanical stress of the wind turbine; and,
  a supervisory controller communicatively coupled to the turbine controller, the supervisory controller comprising a dynamic function module, a condition estimator module, and a function design module,
  wherein the condition estimator module determines a current condition of the wind turbine using, at least, the state estimate, the current condition defining a set of condition parameters of the wind turbine,
  wherein the dynamic function module receives a control function from the function design module, the control function defining a relationship of the set of condition parameters with at least one operational parameter of the wind turbine, and
  wherein the dynamic function module determines and sends the at least one operational parameter to the turbine controller to dynamically control the wind turbine based on the current condition and the control function for multiple dynamic control intervals.

16. The system of claim 15, wherein the set of condition parameters comprises characteristics of at least one of the electrical grid, wind, or an environment of the wind turbine, the set of condition parameters comprising at least one of wind speed, wind direction, wind shear, wind veer, turbulence, ambient temperature, humidity, an operating state of the wind turbine, or one or more grid conditions, wherein the one or more grid conditions comprise at least one of grid power factor, grid voltage, or grid current.

17. The system of claim 15, wherein determining the current condition of the wind turbine using, at least, the state estimate further comprises:
  receiving, via the condition estimator module, the state estimate of the wind turbine and one or more external measurements; and
  determining, via the condition estimator module, the current condition of the wind turbine using the state estimate of the wind turbine and the one or more external measurements.

18. The system of claim 15, wherein the control function comprises at least one of a look-up table or a mathematical function.

19. The system of claim 15, further comprising determining one or more damage levels of one or more components of the wind turbine using one or more damage odometers as a function of the state estimate of the wind turbine, wherein the function design module determines the control function based on at least one of a condition distribution, a model of operational behavior of the wind turbine, a design lifetime of the wind turbine, an elapsed lifetime of the wind turbine, one or more damage limits, the one or more damage levels, or a future value discount.

20. The system of claim 19, wherein the model of operational behavior of the wind turbine defines a mapping from the set of condition parameters of the wind turbine and the at least one operational parameter of the wind turbine to expected power statistics of the wind turbine and an expected increment to the one or more damage levels for each of the multiple dynamic control intervals, wherein the expected power statistics of the wind turbine comprise at least one of a power production, power factor, or power stability of the wind turbine.

* * * * *